J. W. RAPP AND J. VANORIO.
AIRPLANE RIB CONSTRUCTION.
APPLICATION FILED NOV. 19, 1917.
1,397,701.
Patented Nov. 22, 1921.
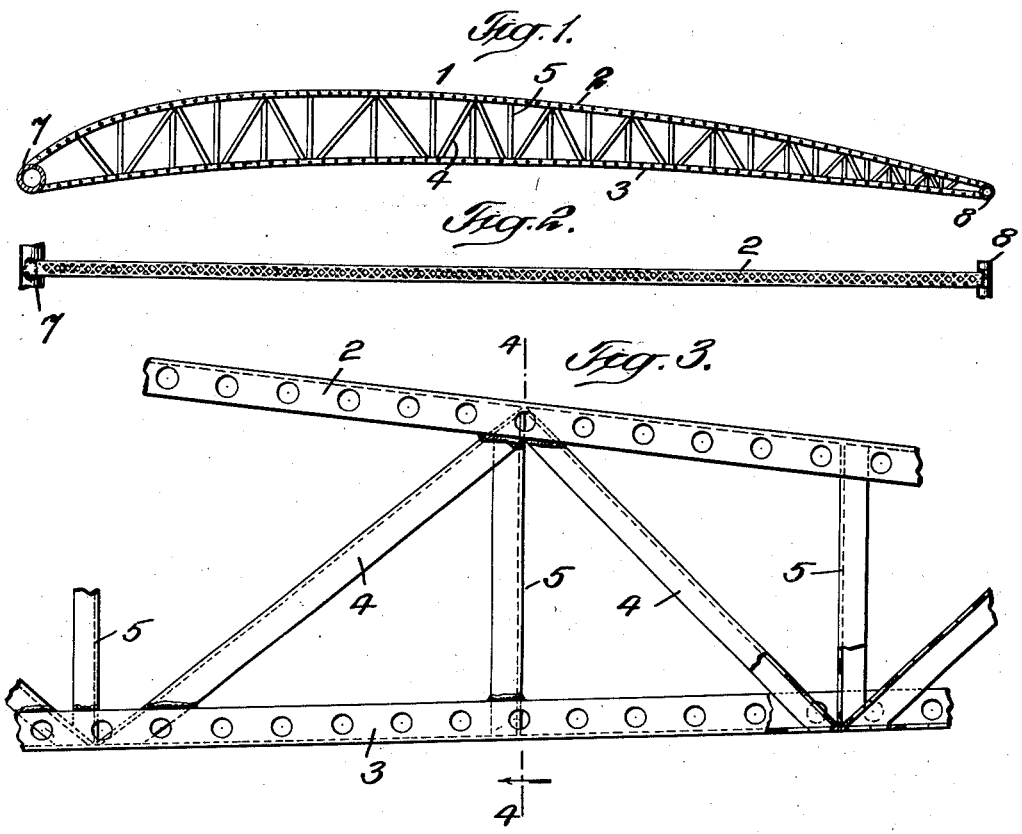
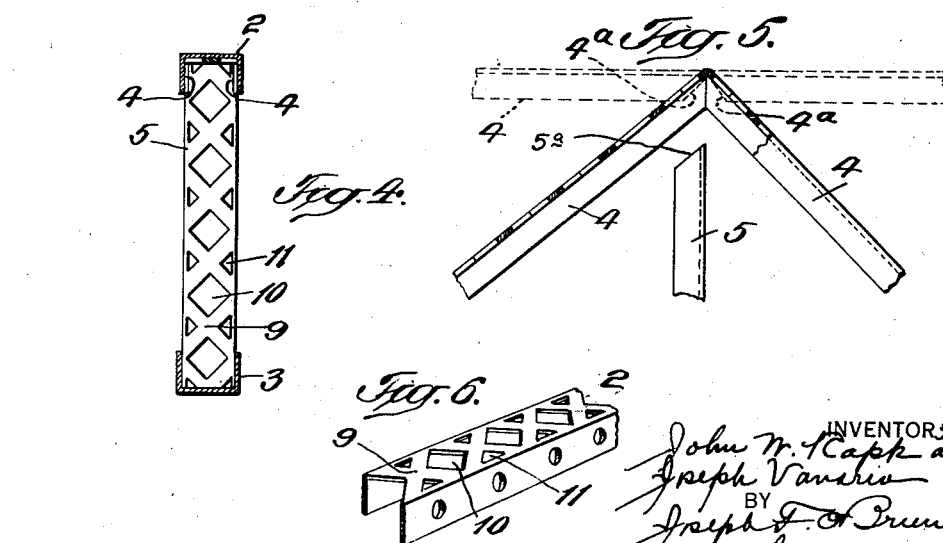
INVENTORS
John W. Rapp and
Joseph Vanorio
BY
Joseph F. O'Brien
Their ATTORNEY

UNITED STATES PATENT OFFICE.

JOHN W. RAPP, OF FLUSHING, AND JOSEPH VANORIO, OF BROOKLYN, NEW YORK; SAID VANORIO ASSIGNOR TO SAID RAPP.

AIRPLANE-RIB CONSTRUCTION.

1,397,701.   Specification of Letters Patent.   Patented Nov. 22, 1921.

Application filed November 19, 1917. Serial No. 202,847.

*To all whom it may concern:*

Be it known that we, JOHN W. RAPP and JOSEPH VANORIO, both citizens of the United States, and residing at Flushing and Brooklyn, respectively, in the counties of Queens and Kings, and State of New York, have invented a new and Improved Airplane-Rib Construction, of which the following specification is a full disclosure.

This invention relates to improvements in airplane rib construction.

By the use of our invention, we are enabled to produce a steel rib for airplane wings or other parts which will not only have sufficient lightness in weight to come within the required weight limits for an airplane wing rib, but will at the same time have much greater strength and rigidity and will afford much greater resistance both against bending and torsional strains or stresses than wooden or other ribs of similar weight and proportions heretofore employed; and furthermore will have all the other manifold advantages of a steel construction over wooden construction.

In a more intense aspect, our invention contemplates the production of a rib for airplane wings and other parts comprising a plurality of channel iron members suitably connected together and arranged to form a box-shaped body, rectangular in cross-section, composed of a series of box-shaped sections, the said channel-iron members having sections of the web portions thereof intermediate the necessary bracing portions cut away for the purpose of reducing the weight of the construction without detracting materially from the strength of such members.

In the accompanying drawings, in which similar reference characters designate corresponding parts throughout the several views, Figure 1 is a side elevation of a wing rib embodying our invention;

Fig. 2 is a plan view of the rib shown in Fig. 1;

Fig. 3 is an enlarged fragmentary view of the wing construction shown in Figs. 1 and 2;

Fig. 4 is a vertical section on the line 4—4 of Fig. 3.

Fig. 5 is an enlarged fragmentary detail in section of the diagonal and bracing member.

Fig. 6 is a fragmentary detail in perspective of the top or bottom channel members employed by us.

Referring now to these drawings, 1 indicates an airplane rib which, as illustrated, is formed of a top horizontal channel member 2, a bottom horizontal channel member 3 of similar cross-section dimensions, the said two members being suitably connected, preferably by welding at their opposite ends to frame members 7 and 8, respectively, and a plurality of diagonal bracing members 4 fitting within flanges of the top and bottom horizontal channel members 2 and 3, respectively. These diagonal members 4 are of similar cross-sectional dimensions preferably arranged in pairs, each pair being formed in one piece as illustrated in Fig. 5, a section of the flanges at opposite sides being cut away to permit the downward bending of such diagonal members from the dotted line position shown in said figure to the solid line position illustrated therein. In this way a solid abutting joint is formed between the members of a pair and the adjacent pairs of diagonal members also have their opposite ends abutting each other, the end portions of the flanges being cut away to permit the ends to lie flat against the web portion of the bottom horizontal member 3 and also to permit the adjacent members of a pair to abut against each other. A vertical strut or bracing member 5 is gaged to fit within the flanges of the horizontal channel and is arranged at each abutting joint between the diagonal members. In order to insert this member at this point the flanges are cut at an angle as shown at 4ᵃ (Fig. 5) and its opposite flanges are pressed inwardly so as to slightly reduce the upper end where it seats within the flanges of the diagonal members. This will be understood from an examination of the upper end of Fig. 4. All of the members are securely welded together at the abutting joints.

It will be seen from the above that we have produced a steel channel bar construction which at all points along its length will be box-shaped or rectangular in cross section with the horizontally-disposed channel members at top and bottom, and that the bracing members are arranged intermediate said top and bottom members in a manner to have their webs and flanges abutting against the horizontally-disposed webs of the longitudinal members so as to produce angular columns formed from the bent-up sheet metal of the channel bars at the corners thereof, which angular columns will provide great resistance against pressure or stress on said longitudinal members. Such a construction not only affords a maximum of strength and rigidity for the rib but also gives a maximum resistance against torsional strains or stresses.

In order to take advantage of this construction and at the same time produce a rib which will come within the weight required for airplane rib constructions we have eliminated from the edge and end portions of the box-shaped sections above referred to portions of the metal thereof between what we shall term bracing portions. In other words we have cut out from the web of each channel iron member a section so as to leave bracing portions integral with the flanges on opposite sides thereof and to provide inter-brace openings between the bracing portions. In this way we have been enabled to reduce the weight of the rib construction without materially reducing the strength of the rib either in regard to bending stresses or torsional stresses.

As shown more clearly in Figs. 4 and 6, we have, in the preferred construction shown herein, cut away portions of the web of the said channel members so as to provide X-shaped portions 9, diamond-shaped openings 10 between the same, and triangular shaped openings 11 between the legs of the X-shaped portions 9. It will be obvious, however, that other shapes of bracing portions 9 may be provided and likewise other forms of openings without departing from the spirit of our invention.

Having described our invention, we claim:

1. A truss frame constituting a rib for airplane wings and air plane parts, made of wholly thin sheet metal channel members, the open sides of the channel shaped members forming the upper and lower chords of the truss frame being opposed to each other, in combination with like channel members forming the struts and ties of the said truss frame adapted to be fitted into and suitably secured to the upper and lower chords, said upper and lower chords being curved toward each other and secured to the front and back frame members of the wing structure.

2. A rib for airplane wings and air plane parts comprising upper and lower chords curved toward each other and formed of thin sheet metal channel members with their open sides opposed to each other, like channel members constituting the struts and ties adapted to be fitted within and secured to the upper and lower chords, said upper and lower chords being secured to the front and back frame members of the wing structure.

3. A truss frame comprising a rib for airplane wings and airplane parts formed with upper and lower chords of thin sheet metal channel members curved toward each other and with their open sides oppositely disposed, and channel members constituting the struts and ties fitted within said chords and permanently and rigidly secured thereto, said upper and lower chords being secured to the front and back frame members of the wing structure.

4. A truss frame constituting a rib for airplane wings and the like, comprising upper and lower chords curved toward each other and formed of thin sheet metal channel members with their open sides facing each other, diagonal channel-iron bracing members secured at opposite ends to said upper and lower chords, and vertical channel iron struts fixedly secured to each chord and engaging said diagonal bracing members within said chords.

5. A truss frame constituting a rib for airplane wings and the like, comprising an upper and lower chord formed of sheet metal channel members with their open sides oppositely disposed to each other, and similarly-shaped diagonal channel bracing members fitted within each of said chords and rigidly and permanently secured thereto at their opposite ends, said upper and lower chords being secured to the front and back frame members of the wing structure.

6. A rib for airplane wings and the like, comprising an upper and lower chord each chord being formed of a channel member with their flanges facing each other, diagonal channel-iron bracing members secured at opposite ends to the said upper and lower chords, and vertical channel-iron struts stretched between said top and bottom members and engaging said diagonal bracing members, all of said channel members having the metal of the web portions cut away to form between the opposite flanges thereof bracing portions and interbrace openings.

In witness whereof, we hereunto subscribe our names, as attested by the two subscribing witnesses.

JOHN W. RAPP.
JOSEPH VANORIO.

Witnesses:
 W. G. LANGE,
 JOSEPH F. O'BRIEN.